Nov. 11, 1958　　　M. R. CINES　　　2,860,126
POLYMERIZATION PROCESS
Filed July 9, 1954　　　　　　　　　　2 Sheets-Sheet 1
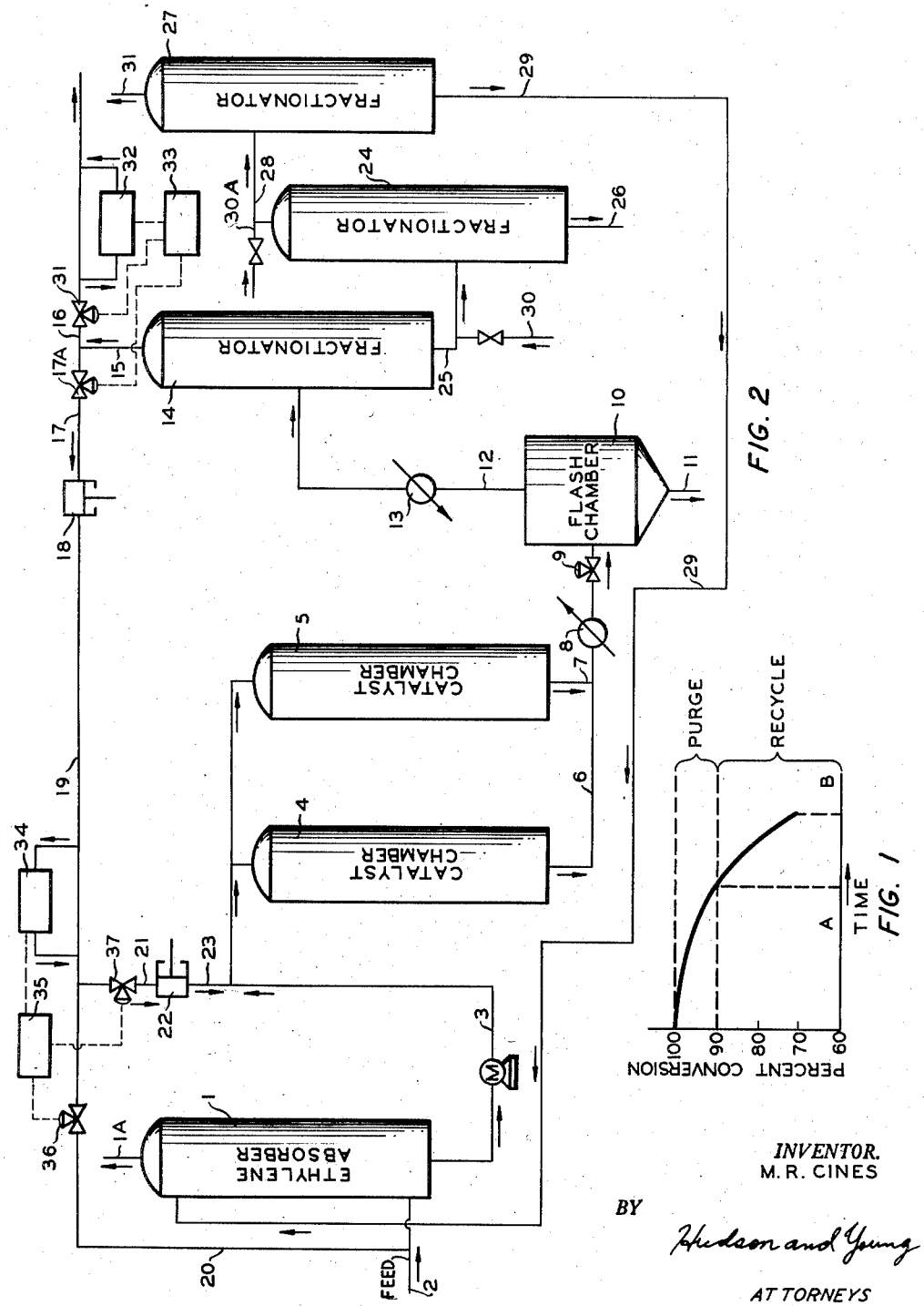
INVENTOR.
M. R. CINES
BY
Hudson and Young
ATTORNEYS Nov. 11, 1958      M. R. CINES      2,860,126

POLYMERIZATION PROCESS

Filed July 9, 1954      2 Sheets-Sheet 2

INVENTOR.
M.R. CINES

BY *Hudson and Young*

ATTORNEYS

United States Patent Office 2,860,126
Patented Nov. 11, 1958

2,860,126

POLYMERIZATION PROCESS

Martin R. Cines, Bartlesville, Okla., assignor to Phillips Petroleum Company, a corporation of Delaware Application July 9, 1954, Serial No. 442,331

16 Claims. (Cl. 260—94.9)

This invention relates to the polymerization of olefinic hydrocarbons to form normally solid polymers. In one aspect, it relates to an improved method for removing inert materials from a polymerization system. In another aspect, it relates to an improved method for purifying feed materials. In another aspect, it relates to a method for increasing catalyst life and productivity.

The copending application of J. P. Hogan and R. L. Banks, Serial No. 333,576, filed January 27, 1953 (now abandoned), discloses a process in which solid polymers of olefins, such as ethylene and propylene, are obtained by contacting the olefin at a temperature in the range 150–400° F. and a pressure in the general range 100–700 p. s. i. with a catalyst comprising chromium oxide associated with another oxide, such as silica, alumina, or mixtures of silica and alumina. It is preferred that the catalyst contain a substantial proportion of chromium in the hexavalent state and preferably that the catalyst comprise at least 0.1 weight percent chromium as the oxide in the hexavalent state. Suitable olefins are aliphatic 1-olefins having a maximum chain length of 8 carbon atoms and no chain branching nearer the double bond than the 4-position. The olefin is preferably contacted with the catalyst as a solution of the olefin in a normally liquid solvent, such as normal pentane, normal hexane, normal heptane, isooctanes (e. g. 2,2,4-trimethylpentane) or normal decane. The solid polymers obtained by the process disclosed in the cited application can be extruded to form pipe, tubing, or insulation, can be molded, or can be used as constituents of protective coating compositions.

In actual practice, olefins used as feed materials for a process of the type above described usually contain impurities which are inert or non-reactive under the polymerization conditions. Certain of these impurities are inert gases, such as nitrogen, ethane, methane and other inert gases. It is generally considered desirable to recycle, to the catalytic conversion step, any unconverted olefin which is recovered from the reaction effluent. This olefin is ordinarily accompanied by one or more of the inert materials, which, if not removed, can build up in the process to an undesirably high concentration. It is therefore desirable to provide for the removal of such inert materials without undue loss of the unreacted olefin.

It has also been found that solvents of the type described above contain impurities which have not been definitely identified and that these impurities after a considerable period of time tend to decrease the activity of the chromium oxide catalyst. Although the precise identity of these materials is not fully understood, it appears that at least some of them have, effectively, boiling points materially lower than that of the solvent. Examples of such impurities are oxygen and small amounts of water. Water can be considered as a low-boiling impurity, since small amounts thereof can be removed from the solvent as a low-boiling azeotrope. It is desirable that such impurities be eliminated from the solvent in order that maximum catalyst life can be obtained.

According to this invention, a fraction recovered from the polymerization effluent and containing substantially all of the unreacted olefin is withdrawn from the polymerization system during that period during which the activity of the catalyst is sufficiently high that a desired predetermined conversion of olefin per pass is obtained. It has been found that the activity of the catalyst, which is initially quite high, decreases as the on-stream period progresses and that, as the activity of the catalyst decreases, the concentration of the olefin in the unreacted olefin fraction recovered from the effluent increases. Since the unreacted olefin is accompanied by inert materials and/or materials which are deleterious to the catalyst, it has been found desirable, in accordance with this invention, to remove the unreacted olefin fraction from the system when the catalyst activity is high and the olefin concentration in said fraction is correspondingly low, and to recycle the unreacted fraction during that part of the on-stream period when the activity of the catalyst has fallen below a predetermined value. Thus, in accordance with this invention, the unreacted fraction is withdrawn from the system when the conversion per pass exceeds a value in the range of 85 to 90 percent. Further according to the invention, the unreacted fraction is recycled, when the activity of the catalyst has declined to a point at which the conversion per pass does not exceed the value previously mentioned. Thus the accumulation of inert materials in the system is prevented and the amount of olefin removed in the vent gas is comparatively small. The vent gas can, of course, be processed for recovery of the olefin if desired.

Further according to this invention, it has been found that materials which damage the catalyst can be eliminated from the system and the catalyst life correspondingly extended by subjecting the solvent, prior to use of the solvent in the polymerization reaction, to fractionation, e. g. fractional distillation, under such conditions that impurities which boil at temperatures substantially below the boiling point of the solvent are removed therefrom.

According to a preferred embodiment of the invention, fresh solvent is added to the system at such a point that it passes to a fractional distillation step in which the polymerization effluent is fractionated, prior to re-entry of the solvent into the catalytic polymerization zone.

In the drawings,

Figure 1 is a graph showing the general relationship between per pass conversion and time on stream.

Figure 2 is a flow diagram illustrating one embodiment of this invention.

Figure 3:
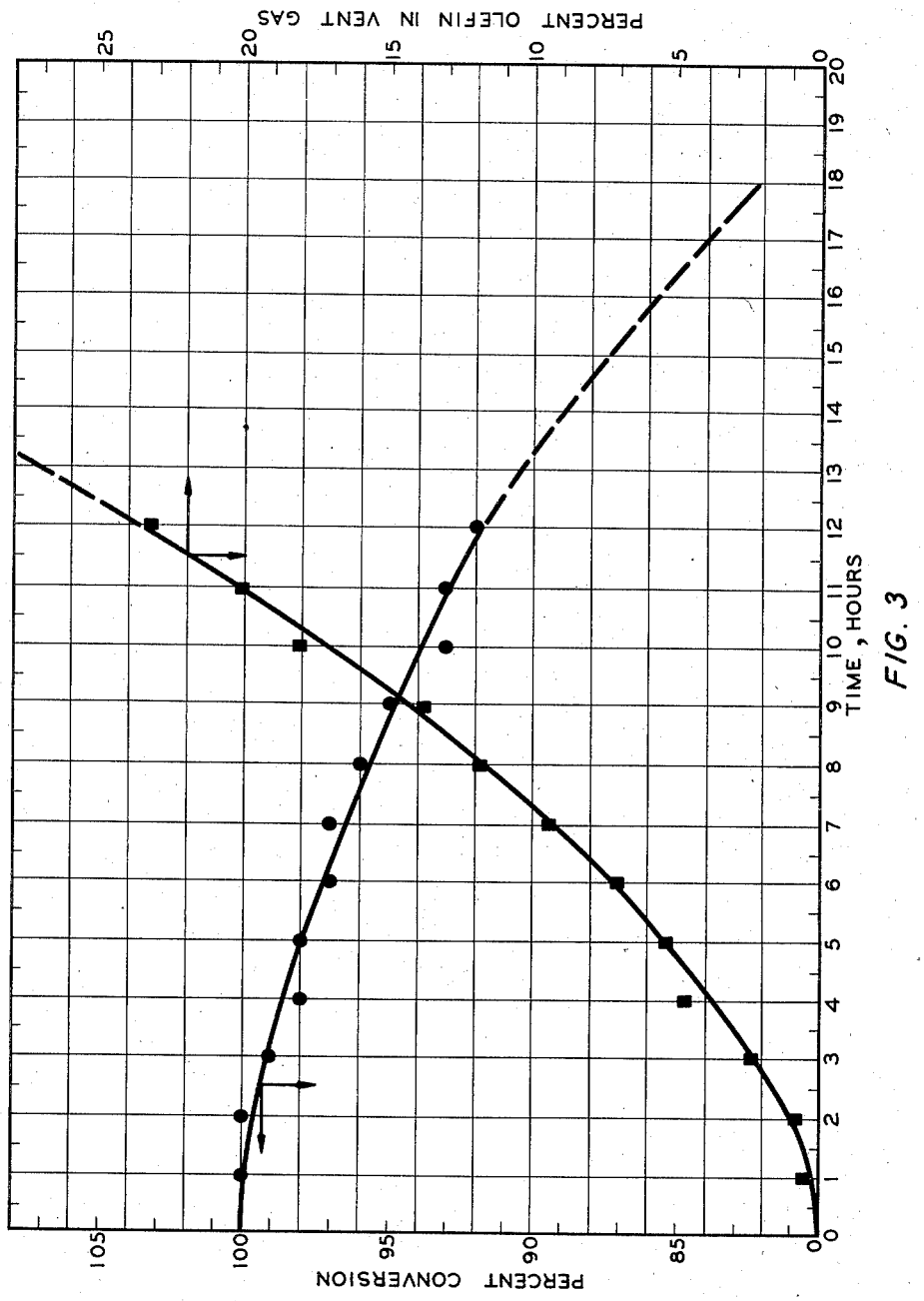
Figure 3 shows the relationship between conversion per pass and time and the relationship between time and olefin concentration in the unreacted fraction which is separated from the polymerization effluent.

As shown in Figure 1, as the on-stream period proceeds, there comes a time when the per pass conversion of olefins drops to a value of 90 percent. During this period, i. e., from 0 to a time designated as A, the unreacted olefin together with accompanying inert materials is withdrawn from the polymerization system. Subsequent to that time, i. e., the time between A and B in Figure 1, the fraction containing unreacted olefin is recycled to the polymerization zone. Subsequent to time B the catalyst is replaced, regenerated or reconditioned.

As shown in Figure 2, a feed material such as ethylene containing from 1 to 5 percent or more of inert impurities, such as ethane, passes to ethylene absorber 1 and therein contacts a solvent such as isooctane (2,2,4-trimethylpentane), which enters absorber 1 through recycle conduit 29. Absorber 1 is operated at moderately elevated pressure, as known in the art, and is regulated to absorb substantially all of the ethylene which enters through inlet 2. Unabsorbed materials are withdrawn through outlet 1A. The enriched solution of ethylene in isooctane, ordinarily containing approximately 2 weight percent ethylene, passes through conduit 3 to either or both of catalyst chambers 4 and 5. As recognized by those skilled in the art, the solution can be passed in parallel through both of chambers 4 and 5 or it can be passed through only one of these chambers, the other being subjected to treatment for reactivation or regeneration of the catalyst. Clearly, any desired number of chambers in series or in parallel can be utilized.

The catalyst chambers contain a suitable catalyst, for example, a catalyst comprising about 2 weight percent of chromium in the form of chromium oxide associated with a mixture comprising about 90 weight percent silica and about 10 percent alumina, as more fully disclosed in the cited application of Hogan and Banks. Suitable reaction conditions are for example, a temperature of about 300° F., a pressure of about 500 p. s. i. and a space velocity of approximately 2 volumes of liquid per volume of catalyst per hour. The catalyst chamber effluent passes through conduit 6 and is heated in heat exchanger 8. The pressure is reduced in pressure reduction valve 9 and a mixture passes into flash chamber 10 in which the temperature is approximately 260° F. and the pressure can be any desired pressure, e. g. atmospheric, below the aforementioned reaction pressure which is suitable for the flash vaporization of substantially all of the solvent and lighter materials from the product polymer. Molten polymer (e. g. at about 260° F.) which is predominantly normally solid, is withdrawn as a product through outlet 11. The vaporized material passes through conduit 12 and is condensed in condenser 13 and passed to fractionator 14, which is ordinarily one or more fractional distillation columns with the usual appurtenant equipment. From fractionator 14, an overhead fraction comprising substantially all of the unreacted ethylene, together with any accompanying inert materials such as ethane, some of which has been absorbed by the isooctane in absorber 1, is withdrawn through conduit 15. During that time period when the per pass conversion in catalyst chamber 4 exceeds 90 percent, the overhead fraction is withdrawn from the system through outlet 16. As the on-stream period proceeds and the activity of the catalyst declines so that the conversion per pass in chamber 4 is at or below 90 percent, the fraction in conduit 15 is passed through conduit 17, compressor 18, and conduit 19. The fraction can then be recycled directly to catalyst chamber 4 and/or 5 through conduit 21, compressor 22 and conduit 23. Alternatively, the ethylene fraction can be recycled by means of conduit 20 through ethylene absorber 1, some of the remaining inert material being thus eliminated through outlet 1A.

The kettle product from fractionator 14 comprises the solvent together with any heavier materials having boiling ranges intermediate the isooctane and the product polymer. This fraction is passed through conduit 25 to fractionator 24 from which any higher boiling material can be withdrawn through outlet 26. The overhead fraction comprising isooctane, together with any small remaining amounts of lower-boiling impurities, is passed through conduit 28 to fractionator 27 from which the lower boiling impurities are removed through outlet 31. Purified isooctane is recycled through conduit 29.

According to this invention, the makeup isooctane which is added to the system is added through inlet 30 and passes through fractionators 24 and 27, wherein impurities which are deleterious to the catalyst are eliminated. Alternatively, though less preferably, makeup isooctane can be added at inlet 30A.

If desired, the foregoing operations can be made automatic by the use of motor valves 17A and 31 and analyzer 32 together with controller 33. Motor valves 17A and 31 are of any design known in the art, such as a diaphragm valve which is responsive to externally applied air pressure. Analyzer 32 can be any instrument which automatically analyzes a sample of the material in conduit 16, such as a sample being passed through a bypass line and through analyzer 32. An example of a suitable type of analyzer is disclosed in United States Patent 2,579,825 to J. W. Hutchins (1951). Analyzer 32 can be connected with controller 33, which can be any combination of potentiometers, servo mechanisms, and/or additional known mechanisms for converting an electrical impulse into an air pressure or a mechanical force, which is transmitted to motor valves 17A and 31.

Thus, when the ethylene content in outlet 16 is below a predetermined value, indicating a per pass conversion in excess of 90 percent, this concentration of ethylene is detected by analyzer 32 which transmits an electrical impulse to controller 33, which in turn maintains valve 31 open and valve 17A closed. When the per pass conversion drops below 90 percent, the correspondingly increased ethylene content of the material in outlet 16 is detected by analyzer 32, and controller 33 then opens valve 17A and closes valve 31. As will be understood by those skilled in the art, analyzer 32 and controller 33 are standardized and calibrated according to the conditions and materials utilized in the particular system which is being controlled.

A similar arragement can be used for controlling the passage of recycle ethylene directly to reactors 4 and 5 or through absorber 1. Thus analyzer 34, which is similar to analyzer 32, and controller 35, which is similar to controller 33, are provided in conjunction with motor valves 36 and 37. Thus when the concentration of recycle ethylene drops below a predetermined value the concentration is detected by analyzer 34 which operates through controller 35 to close valve 37 and open valve 36 thus causing the stream which is comparatively dilute in ethylene to pass through absorber 1 for concentration. When the ethylene concentration in line 19 is above a predetermined value, analyzer 34 and controller 35 act to close valve 36 and open valve 37, thus causing the recycle stream to pass directly to catalyst chamber 4 or 5.

The predetermined value of olefin concentration at which the flow of the unreacted fraction is diverted as described depends on several factors such as the purity of the olefin entering the system and on the amount of inert materials introduced from other sources. It can readily be determined by those skilled in the art by plotting curves of the type shown in Figure 3 for any particular set of conditions.

Figure 3 shows two curves which show the relationship of ethylene conversion per pass and of olefin concentration in the unreacted fraction to the on-stream time of a given mass of catalyst. The curve which is drawn through the points indicated as squares shows the relationship between olefin concentration in the unreacted fraction of the effluent to on-stream time. The curve drawn through the points indicated as circles shows the relationship between conversion per pass and on-stream time. The data on which the curves of Figure 3 were based were obtained in a system in which a 2 percent solution of ethylene in isooctane was contacted with a catalyst comprising 2.5 weight percent chromium as chromium oxide on 90 weight percent silica and 10 weight per cent alumina and contained in two reaction chambers connected in series, sufficient ethylene being added between reactors to increase the ethylene concentration entering the second reactor to 2 percent. The initial composition of the ethylene used was 78.8 volume percent ethylene and 21.2 volume percent ethane. The operating conditions in the reactors were: a temperature of 330° F., a pressure of 450 p. s. i., and a liquid hourly space velocity of 6. The total volume of catalyst was 225 cc., and the bed depth was 17 inches. From the curves shown in Figure 3, it is evident that the conversion per pass decreased from almost 100 percent to approximately 90 percent in about 13.3 hours, and the concentration of ethylene in the gaseous fraction vented from the system, at a conversion per pass of 90 percent, was approximately 28 volume percent.

*Example I*

Ethylene of 80 percent purity, the principal impurity being ethane, is mixed with 2,2,4-trimethylpentane to obtain a mixture containing approximately 2 weight percent ethylene. The 2,2,4-trimethylpentane has been previously purified by distillation to remove all impurities boiling below 95° C. The feed mixture is passed downwardly through a vertical reactor containing a fixed bed of catalyst comprising 2.5 weight percent chromium, in the form of chromium oxide, on a silica-alumina composite. The catalyst is prepared by depositing an aqueous solution of chromic nitrate on a commercial coprecipitated cracking catalyst comprising 90 weight percent silica and 10 weight alumina, drying the resulting mixture, igniting the dried composite to convert the nitrate to chromium oxide and activating by heating in a current of dry air at 950° F. for five hours. The hexavalent chromium content of the resulting catalyst is approximately 1.4 weight percent.

The feed mixture is passed through the catalyst at a reaction temperature of approximately 320° F., a pressure of 400 p. s. i. and a liquid hourly space velocity of 4.5. The effluent from the reactor is heated to 350° F. and flashed at atmospheric pressure. A polymer is recovered as the residue from the flashing operation. The polymer is brittle, has a molecular weight, as determined by measurement of the relative viscosity of a solution of the polymer in tetralin, of 10,200, a density of 0.95 at 20° C., and a melting point of 240° F., determined by plotting a cooling curve.

The fraction vaporized in the flashing operation is continuously passed to a fractional distillation column from which all normally gaseous material is removed as an overhead fraction. The kettle residue from the column is recycled to the reactor.

During the first 13 hours of the polymerization, the ethylene conversion per pass is greater than 90 percent. During this time, the normally gaseous fraction removed from the fractionating column contains a maximum of approximately 26 volume percent of ethylene, together with ethane, and is continuously vented from the system. After about 13 hours, the conversion per pass decreases to less than 90 percent and the ethylene content of the gaseous fraction is greater than 26 volume percent. The gaseous fraction is then recycled to the reactor for the remainder of the on-stream period. The total duration of the on-stream period is 19 hours, at the end of which the conversion per pass is 80 percent. The catalyst is then regenerated.

*Example II*

An operation of the type described in Example I is begun with isooctane (2,2,4-trimethylpentane) which is substantially saturated with water and oxygen at atmospheric temperature and pressure. After approximately 3 hours on stream, the conversion of ethylene per pass has decreased to below 90 percent.

At this point, the catalyst is regenerated by passing isooctane through the reactor at 375° F. to remove deposited polymer, passing a mixture of nitrogen and oxygen, containing approximately 5 volume percent oxygen, through the reactor at a rate of approximately 100 cubic feet per hour and a maximum temperature of 1050° F. to burn off residual carbonaceous material. The catalyst is then treated with dry air at a gaseous hourly space velocity of about 200 and a temperature of approximately 1000° F. for a period of five hours. The polymerization is then resumed, all of the make-up isooctane being added to the system through a separate fractional distillation column wherein all material boiling below 95° C. is distilled off and removed from the system. The polymerization is continued for 11 hours, and for approximately the first five hours, the polymerization per pass is greater than 90 percent, the average conversion being approximately 85 percent.

While certain process steps, structures and examples have been described for purposes of illustration, it is clear that the invention is not limited thereto. The essence of the invention is that in a process in which an olefin is polymerized in the presence of a chromium oxide catalyst to form a solid polymer, there has been provided the step of removing unreacted olefin together with inert materials from the system only when the conversion of olefin per pass exceeds a predetermined value, and that the catalyst life is lengthened by subjecting the solvent, in which the reactant olefin is dissolved prior to reaction, to fractionation to remove impurities prior to passage of the solvent to the catalytic reactor. While the invention has been described in connection with a chromium oxide polymerization catalyst, it can be practiced in connection with processes utilizing other polymerization catalysts. Also the invention can be applied to the polymerization of olefins other than ethylene, e. g., propylene, 1-butene, 1-pentene, and hexenes.

I claim:

1. In a process in which ethylene, in solution in a hydrocarbon solvent, is contacted, at polymerization conditions of pressure and temperature, with a chromium oxide catalyst which catalyzes the conversion of olefins to solid polymers and the activity of which is adversely affected by the presence of impurities in said solvent, which impurities have lower boiling points than said solvent an effluent is treated to remove a normally gaseous fraction therefrom, the thus treated effluent is fractionally distilled in a distillation zone to obtain a fraction lower-boiling than said solvent, a solvent fraction which is recycled to the contacting step, and a fraction higher boiling than said solvent, and fresh solvent is added to the system, the improvement which comprises adding said fresh solvent to the mixture passing to said distillation zone.

2. A process according to claim 1 wherein said solvent is isooctane.

3. A process according to claim 1 wherein said solvent is n-pentane.

4. A process according to claim 1 wherein said solvent is n-heptane.

5. A process according to claim 1 wherein said solvent is n-decane.

6. A process according to claim 1 wherein said solvent is n-dodecane.

7. In a process in which an olefin is contacted with a polymerization catalyst consisting essentially of chromium oxide comprising a substantial proportion of hexavalent chromium and being supported on at least one oxide selected from the group consisting of silica and alumina to produce a normally solid polymer, and a fraction containing unreacted olefin is separated from the reaction effluent, the improvement which comprises withdrawing said fraction from the system only when the olefin conversion per pass is higher than a predetermined value.

8. In a process in which a monoolefin is converted to a normally solid polymer by contacting said olefin with a catalyst consisting essentially of chromium oxide comprising a substantial proportion of hexavalent chromium and being supported on at least one oxide selected from the group consisting of silica and alumina, the olefin conversion per pass decreasing as the polymerization proceeds, and a fraction comprising unreacted olefin is separated from a resulting reaction effluent, the improvement which comprises withdrawing said fraction from the system when the conversion per pass exceeds a value in the range 85 to 90 percent, and recycling said fraction to the polymerization step when the conversion does not exceed said value.

9. A process according to claim 8 wherein said monoolefin is ethylene, said value is about 85 percent, and said fraction is recycled directly to said polymerization step without intervening treatment.

10. A process according to claim 8 wherein said monoolefin is ethylene, said value is about 90 percent and said fraction is treated with a liquid absorbent to concentrate the ethylene which is recycled to the polymerization step.

11. A process according to claim 10 wherein said absorbent is a hydrocarbon solvent utilized to form a solution of ethylene which solution is used as the feed to the polymerization step.

12. A process according to claim 11 wherein said solvent is isooctane.

13. In a process in which at least one 1-olefin having a maximum chain length of 8 carbon atoms and no chain branching nearer the double bond than the 4-position is contacted, in solution in a normally liquid, saturated hydrocarbon solvent with a chromium oxide catalyst which catalyzes the conversion of olefins to solid polymers and the activity of which is adversely affected by the presence of impurities in said solvent, which impurities have lower boiling points than said solvent under polymerization conditions of temperature and pressure to obtain a polymerization effluent containing normally solid polymer and polymer is recovered from said effluent, the improvement which comprises removing from the effluent from which polymer has been removed a fraction containing unreacted olefin together with inert materials, withdrawing said fraction from the system when the polymerization per pass is greater than a value in the range 85 to 90 percent, recycling said fraction to the polymerization step when the polymerization per pass is less than said value, recovering a solvent fraction from said effluent from which polymer has been removed, fractionally distilling said solvent fraction in a distillation zone to remove therefrom impurities having boiling points different from that of said solvent, and passing fresh solvent to said distillation zone as the makeup solvent for the process.

14. In a process in which an aliphatic 1-olefin having a maximum chain length of 8 carbon atoms and no branching nearer the double bond than the 4-position is contacted, in solution in a liquid hydrocarbon solvent which is inert under the reaction conditions, at polymerization conditions of temperature and pressure, with a chromium oxide catalyst which catalyzes the conversion of olefins to solid polymers and the activity of which is adversely affected by the presence of impurities in said solvent, which impurities have lower boiling points than said solvent, an effluent is fractionated to recover a fraction higher boiling than said solvent, a fraction comprising said solvent, and at least one fraction lower boiling than said solvent, makeup solvent being continuously added to the system, the improvement which comprises adding said makeup solvent to the mixture passing to the zone in which the fractionation of said effluent is effected.

15. In a process in which ethylene is contacted, in solution in a liquid hydrocarbon solvent which is inert and nondeleterious under the contacting conditions, at a temperature in the range 150 to 450° F. and a pressure sufficient to maintain said solvent substantially in the liquid phase, with a chromium oxide catalyst which catalyzes the conversion of olefins to solid polymers and the activity of which is adversely affected by the presence of impurities in said solvent, which impurities have lower boiling points than said solvent, an effluent is fractionated to recover unreacted ethylene, the remaining material is passed to a fractional distillation zone wherein a fraction higher boiling than said solvent, a fraction comprising said solvent, and at least one fraction containing substantially all remaining materials lower boiling than said solvent are obtained, the last mentioned fraction being continuously removed from the system, the improvement which comprises introducing substantially all of the makeup solvent supplied to the system into said fractional distillation zone.

16. In a process in which an aliphatic 1-olefin having a maximum chain length of 8 carbon atoms and no branching nearer the double bond than the 4-position is converted to a normally solid polymer by contacting with a catalyst consisting of chromium oxide including at least 0.1 weight percent hexavalent chromium oxide supported on at least one oxide selected from the group consisting of silica and alumina, the olefin conversion per pass decreasing as the polymerization proceeds, and a fraction comprising unreacted olefin together with at least one inert material is separated from a resulting reaction effluent, the improvement which comprises withdrawing said fraction from the system when the conversion per pass exceeds a value in the range 85 to 90 percent, and recycling said fraction to the conversion step when the conversion does not exceed said value.

References Cited in the file of this patent
UNITED STATES PATENTS

| | | |
|---|---|---|
| 2,691,647 | Field et al. | Oct. 12, 1954 |
| 2,692,259 | Peters | Oct. 19, 1954 |